(12) United States Patent
Isaka

(10) Patent No.: US 7,594,539 B2
(45) Date of Patent: Sep. 29, 2009

(54) HEAT EXCHANGE TYPE VENTILATOR

(75) Inventor: Kinji Isaka, Aichi (JP)

(73) Assignee: Panasonic Corporation, Osaka (JP)

( * ) Notice: Subject to any disclaimer, the term of this patent is extended or adjusted under 35 U.S.C. 154(b) by 419 days.

(21) Appl. No.: 10/589,774

(22) PCT Filed: Feb. 18, 2005

(86) PCT No.: PCT/JP2005/003070

§ 371 (c)(1),
(2), (4) Date: Aug. 17, 2006

(87) PCT Pub. No.: WO2005/080882

PCT Pub. Date: Sep. 1, 2005

(65) Prior Publication Data

US 2007/0169927 A1 Jul. 26, 2007

(30) Foreign Application Priority Data

Feb. 19, 2004 (JP) ............................. 2004-042430

(51) Int. Cl.
*F25B 29/00* (2006.01)
(52) U.S. Cl. ................ 165/248; 165/249; 454/239
(58) Field of Classification Search ......... 165/233–234, 165/246–252; 236/49.1; 454/238–239, 242
See application file for complete search history.

(56) References Cited

U.S. PATENT DOCUMENTS 5,257,736 A * 11/1993 Roy .......................... 236/49.3
5,632,334 A * 5/1997 Grinbergs et al. ............ 165/232
6,577,031 B2 * 6/2003 Morooka et al. ............ 310/68 R
2002/0139514 A1 * 10/2002 Lagace et al. ................. 165/54

FOREIGN PATENT DOCUMENTS

| JP | 58-002527 | | 1/1983 |
| JP | 62-019631 | A | 1/1987 |
| JP | 63-190837 | | 12/1988 |
| JP | 02-103640 | | 8/1990 |
| JP | 04-283333 | | 10/1992 |
| JP | 05-141737 | A | 6/1993 |
| JP | 06-002038 | | 1/1994 |
| JP | 10281523 | A * | 10/1998 |
| JP | 2003-148780 | A | 5/2003 |

OTHER PUBLICATIONS

International Search Report for Application No. PCT/JP2005/003070, dated Mar. 29, 2005.

* cited by examiner

*Primary Examiner*—Ljiljana (Lil) V Ciric
(74) *Attorney, Agent, or Firm*—RatnerPrestia

(57) ABSTRACT

A heat exchange type ventilator allows preventing its heat exchanger from being clogged with buildup of ice, and also alleviating cold-draft feeling. This ventilator has an exhaust-air coupling section and a supply-air coupling section, and a ventilating unit which includes an exhaust-air outlet and a supply-air inlet, a motor for driving an exhaust-air fan and a supply-air fan, the heat exchanger for carrying out heat recovery between interior air and outside air, and a cut-off damper for cutting off a supply-air flow in a supply-air channel. Supply-air temperature sensing means for sensing a temperature of the outside air issues a signal, which prompts the damper to cut off the supply-air flow and reduce a volume of the exhaust-air.

10 Claims, 5 Drawing Sheets

HEAT EXCHANGE TYPE VENTILATOR

This application is a U.S. national phase application of PCT International Application PCT/JP2005/003070.

TECHNICAL FIELD

The present invention relates to a heat exchange type ventilator, having a heat exchanger for heat recovery, to be used in an environment where outside air at a low temperature is drawn in.

BACKGROUND ART

During the winter season such as −10 degree C. or lower, while such cool outside air undergoes heat exchange in a heat exchanger of this kind of ventilators, exhaust air undergoes heat recovery during passing through an air channel separated from that of the cool outside air. Moisture in the exhaust air is thus frozen and clogs in the heat exchanger at the exhausting channel. It is acknowledged that this clog substantially reduces the exhaust air flow. Reduction of the exhaust air flow causes insufficient supply of heat energy to the outside fresh air to be drawn inside, so that the outside air cannot be warmed up to the room temperature. To overcome this inconvenience, i.e. a resident feels the supplied air rather cool, a method is proposed and disclosed in, e.g. Japanese Utility Model Publication No. H02-103640.

A conventional heat exchange type ventilator is described hereinafter with reference to FIG. 8. As shown in FIG. 8, box-like enclosure 101 comprises the following elements:
- inside air inlet 103 and inside air outlet 104 both disposed at the front of enclosure 101 and communicating with room 102; and
- outside air inlet 106 and outside air outlet 107 both disposed at the rear of enclosure 101 and communicating with the outside 105. Exhaust air channel A-A' and supply air channel B-B' are formed inside of box-like enclosure 101. Exhaust air channel A-A' connects inside air inlet 103 to outside air outlet 107, and includes exhaust-air fan 108 fixed to a first shaft of motor 109. Supply air channel B-B' connects outside air inlet 106 to inside air outlet 104, and includes supply-air fan 110 fixed to a second shaft of motor 109. Partition 111 separates channel A-A' from channel B-B' and yet crosses the two channels in part. Heat exchanger 112 is placed at the intersection of the two channels. Damper 113 working at around 0 (zero) degree C. includes shaft 114 and hinge 115, so that it rotates, bends, and elongates around shaft 114 and hinge 115. Damper 113 thus can open the supply air channel or close it in part.

DISCLOSURE OF INVENTION

A heat exchange type ventilator of the present invention includes the following elements:
- an exhaust-air coupling section communicating with outdoors via a duct for forming an exhaust-air channel and coupled to a lateral side of the ventilator;
- a supply-air coupling section communicating with outdoors via a duct for forming a supply-air channel and coupled to a lateral side of the ventilator; and
- a ventilating unit shaping like a box and including an exhaust-air outlet for sucking stale interior air through an opening disposed an underside of the ventilating unit and a supply-air inlet for drawing fresh outside air into a room, the ventilating unit being equipped with;
  - a motor for driving an exhaust-air fan and a supply-air fan;
  - a heat exchanger for recovering exhausted heat between the interior air sucked through the exhaust-air outlet and the fresh outdoor air drawn in;
  - a cut-off damper for cutting off a flow of the supply-air in the supply-air channel running from the supply-air coupling section to the supply-air inlet; and
  - supply-air temperature sensing means for sensing a temperature of the outside air drawn in.

The cut-off damper works based on a signal issued from the supply-air temperature sensing means, and cuts off the flow of supply-air. An exhaust-air volume is thus reduced by the exhaust-air fan.

DETAILED DESCRIPTION OF PREFERRED EMBODIMENTS

Figure 1:
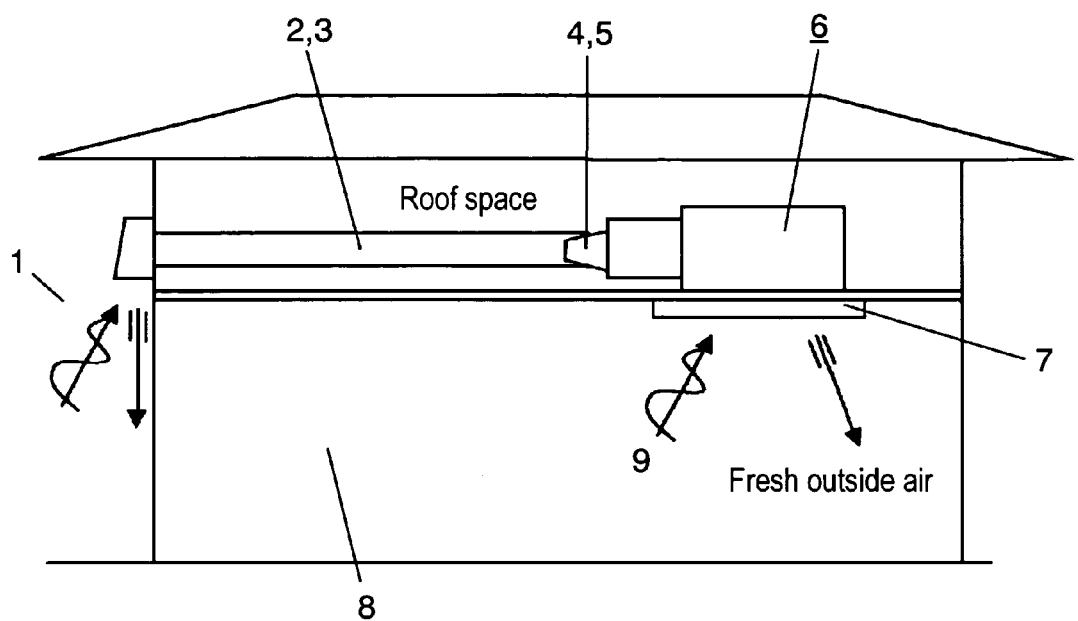
FIG. 1 shows a placement of a heat exchange type ventilator in a house in accordance with an embodiment of the present invention.
Figure 2:
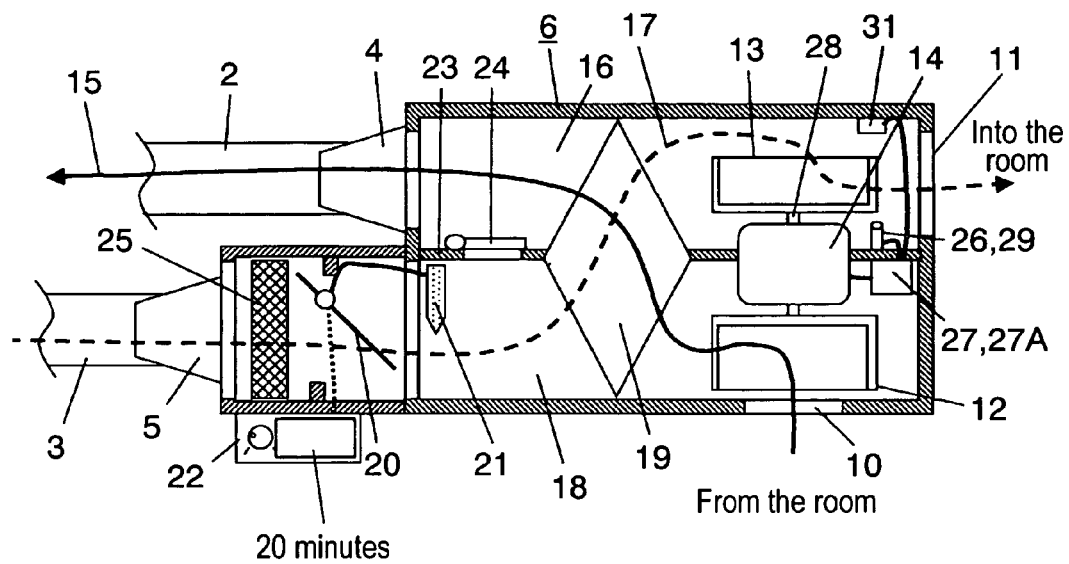
FIG. 2 shows a front view illustrating a structure of a heat exchange type ventilator in accordance with an embodiment of the present invention.
Figure 3:
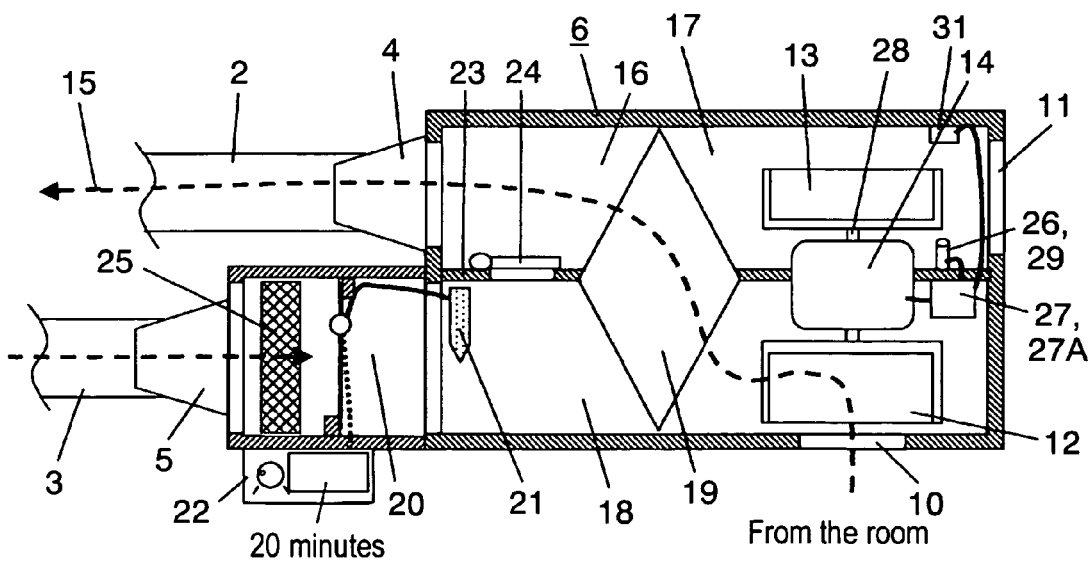
FIG. 3 shows a front view of a cut-off damper in operation of a heat exchange type ventilator in accordance with an embodiment of the present invention.
Figure 4:
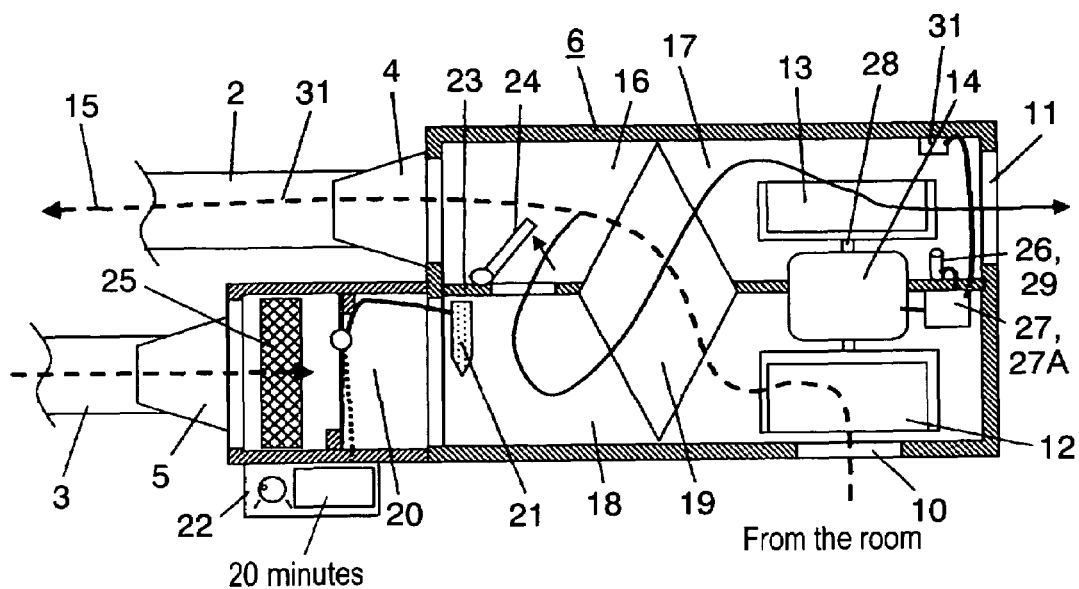
FIG. 4 shows a front view of an on-off valve opened of a heat exchange type ventilator in accordance with an embodiment of the present invention.

The conventional heat exchange type ventilator previously discussed can close the supply-air flow channel in the heat exchanger only in part by rotating, bending or elongating the damper. Thus when fresh outside air at an extremely low temperature is supplied, the supply-air flows into the heat exchanger getting around the partially closed part, so that blockage due to buildup of ice in the heat exchanger cannot be prevented 100%. On top of that, heat recovery through the exhaust air is not sufficiently done by the heat exchanger, so that the supply-air at a temperature below zero even provided with heat is sometimes drawn into the room. The residents are thus obliged to feel rather cool.

The present invention addresses the foregoing problem, and aims to provide a heat exchange type ventilator which can prevent the heat exchanger from being clogged with buildup of ice and can alleviate the feeling of cold-draft.

The present invention advantageously prevents a heat exchanger from being clogged with buildup of ice, thereby providing a heat exchange type ventilator free from giving the residents the feeling of cold draft.

The present invention advantageously allows the heat exchanger to be operable free from buildup of ice even when fresh outside air at an extremely low temperature is drawn into the heat exchanger, thereby providing a heat exchange type ventilator which does not supply air at a low temperature into the room.

Exemplary embodiments of the present invention are demonstrated hereinafter with reference to the accompanying drawings.

Embodiment 1

As shown in FIG. 1 through FIG. 4, the heat exchange type ventilator of the present invention includes exhaust-air coupling section 4 and supply-air coupling section 5 both communicating with outdoors 1 via exhaust-air duct 2 and supply-air duct 3 and connected to the lateral face of the ventilator, so that channels of exhaust air flow and supply air flow are formed. This heat exchange type ventilator is equipped with box-like ventilating unit 6 which includes air outlet 10 for sucking stale air 9 from room 8 via opening 7 disposed on underside of unit 6 and air inlet 11 for drawing fresh outside air from outdoors 1 into room 8. In ventilating unit 6, there are following elements:

motor 14 for driving both of exhaust-air fan 12 and supply-air fan 13;

heat exchanger 19 for carrying out heat recovery between the interior air sucked from air outlet 10 and fresh outside air drawn from outdoors 1;

cut-off damper 20 for cutting off the flow of supply-air 17 in supply-air channel 18 running from supply-air coupling section 5 to air inlet 11; and supply-air temperature sensing means 21 for sensing a temperature of the fresh outside air drawn in.

Cut-off damper 20 cuts off the flow of supply-air 17 based on a signal from supply-air temperature sensing means 21. At the same time, exhausted air volume by exhaust-air fan 12 is reduced based on the signal supplied from sensing means 21.

The foregoing structure is more detailed hereinafter. The heat exchange type ventilator comprises the following elements:

box-like ventilating unit 6 having exhaust-air coupling section 4 and supply-air coupling section 5 both communicating with outdoors 1 via exhaust-air duct 2 and supply-air duct 3, both of coupling sections 4 and 5 disposed on the lateral face of ventilating unit 6;

air outlet 10 disposed at an opening provided to the underside of unit 6 and communicating with room 8 for exhausting stale air 9 from room 8, and air inlet 11 for drawing fresh outside air from outdoors 1 into room 8.

Ventilating unit 6 includes motor 14, which links exhaust air fan 12 and supply air fan 13 and drives both of the fans, and changes air volume in a greater amount or a smaller amount. Stale air 9 sucked from outlet 10 does not waste the heat energy contained therein in exhaust air channel 16 and supply air channel 18, but heat exchanger 19 is provided for delivering the heat energy to supply-air 17 and recovering the energy by itself. The flow of exhaust air 15, which is sucked by exhaust-air fan 12 and passes through exhaust-air coupling section 4 and exhaust-air duct 2, then is exhausted to outdoors 1, forms exhaust air channel 16. The flow of supply-air 17, which passes through supply-air duct 3 and supply-air coupling section 5, and is blown by supply-air fan 13, then is discharged from air inlet 11 into the room, forms supply-air channel 18. Supply-air coupling section 5 in channel 18 has heating means 25 inside thereof for heating supply-air 17 before supply-air 17 flows in heat exchanger 19. Cut-off damper 20 is placed downstream of supply-air 17 and upstream of blowing of heat exchanger 19. Damper 20 cuts off the flow of supply-air 17 and preferably opens/closes a plate-like valve. Supply-air temperature sensing means 21 is placed in supply-air channel 18 for measuring a temperature of supply-air 17. Sensing means 21 is preferably formed of bimetal or thermistor. When a temperature of the supply-air to be drawn in is lower than a given temperature, sensing means 21 issues a signal so that damper 20 is opened/closed. Timer 22 is available for the resident or installing engineer to arbitrarily set a time of closing the valve when he or she receives the signal from sensing means 21.

Wall 23, which partitions exhaust-air channel 16 from supply-air channel 18 in ventilating unit 6, has openings, and the openings allow channel 16 to communicate with channel 18, and yet, on-off valve 24 for covering the openings is available.

In the vicinity of exhaust-air fan 12, there is rpm sensing means 26 including a transmitter for transmitting a pulse-wave having a variable and stationary cycle and receiver 31 for receiving the pulse wave. Rpm control means 27 is available for changing and controlling an input frequency to motor 14 in order to change the rpm of exhaust-air fan 12. The change in the rpm is carried out by comparing a signal supplied from rpm sensing means 26 with a given set value.

Moisture contained in exhaust air 15 is quickly cooled by the supply air at a temperature below −10 degree C. because of the heat exchange with supply-air 17, which supply-air is to be drawn into room 8 through supply-air channel 18. The moisture is iced after passing through heat exchanger 19 and the ice is built up near an exhaust-air outlet of heat exchanger 19. The continuous cooling enlarges the buildup of ice, thereby clogging an air path of heat exchanger 19. If this state continues, exhaust-air channel 16 is eventually closed by the ice, so that exhaust air 15 stagnates. However, supply air temperature sensing means 21 senses the temperature of supply-air in advance. Assume that a given temperature is set at −3 degree C., and if supply-air to be drawn is below −3 degree C., contacts of bimetal are closed, so that a current runs through the contacts, and prompts cut-off damper 20 to drive, then damper 20 stops the flow of supply-air 17 completely. The buildup of ice in heat exchanger 19 can be thus prevented before it happened. When damper 20 cuts off supply-air 17, supply-air fan 13 in supply-air channel 18 becomes close to no-load running, which increases the rpm of fan 13. Exhaust-air fan 12 on the other side of shaft 28 of motor 14, which drives supply-air fan 13, also increases its rpm. However, the signal indicating a close of damper 20 is transmitted to motor 14, so that the rpm of the rotary shaft is forcibly reduced, which thus suppresses a sharp increase of exhaust-air volume. As a result, an increase of draft coming into the room through crevices due to excessive sucking can be prevented, or an inconvenience such as the door is hard to open due to an extreme negative pressure in the room can be prevented.

When the temperature sensed by sensing means 21 exceeds the set value, damper 20 returns to the open state, so that the regular operation resumes.

Supply-air 17, at a temperature below −10 degree C., drawn from outdoors 1 is sensed by sensing means 21 that its temperature is lower than the set temperature, then a closing signal is issued so that damper 20 is closed. Supply-air channel 18 thus closed by damper 20 is split into two sections, i.e. a section of low-temperature supply-air and another section influenced by the interior air, so that an atmospheric temperature around sensing means 21 gradually rises, and eventually the temperature exceeds the set temperature. This raised temperature is sensed, and a signal of releasing the close is issued to damper 20. Meanwhile if supply-air temperature sensing means 21 is placed near motor 14, and sensing means 21 is thus warmed up quickly, then damper 20 is opened again in several minutes or several seconds just after damper 20 has been closed, so that objectionable and continuous pattering noises are sometimes generated. However, since the closing time can be set arbitrarily with timer 22, when an interval between a closing signal and an opening signal of damper 20 is too short, the interval can be set arbitrarily so that damper 20 can be closed/opened free from the objectionable noises. Sequential opens and closes of damper 20 can be thus prevented, so that the service life of damper 20 can be substantially extended although the service life is subjected to malfunction or deformation due to fatigue.

When damper 20 is closed, opening of on-off valve 24 allows exhaust-air channel 16 to communicate with supply-air channel 18 via the openings of wall 23. This structure allows exhaust air 15 in part to pass through again heat exchanger 19 as supply-air, thereby pre-heating the structural elements of heat exchanger 19 which has been cooled down by supply-air 17. As a result, the iced moisture can be defrosted faster. At the same time, exhaust-air 15 flows in supply-air channel 18 again, so that a difference in pressure between exhaust-air channel 16 and supply-air channel 18 can become smaller. The smaller difference in pressure allows suppressing the rpm of exhaust-air fan 12 to a low level although the rpm has been raised by the closing of supply-air 17, and also reducing the noises.

Supply-air 17 is preheated up to a temperature over the set temperature such as −10 degree C. by heating means 25, thereby preventing heat exchanger 19 from being frozen. The preheating of supply-air 17 raises the temperature of fresh outside air to be drawn into room 8 higher than the temperature set by supply-air temperature sensing means 21, so that the ventilator can be continuously operated without working damper 20. This mechanism allows the resident to obtain fresh air from outdoor 1 not in a reduced volume but in a sufficient volume. Even the heat of exhaust-air 15 is given to supply-air 17 by heat exchanger 19, the resident sometimes feels supply-air 17 rather cool. In such a case, the temperature of supply-air 17 can be raised to an appropriate temperature by heating means 25, so that comfortable air circulation can be created in room 8.

Motor 14 is a DC motor (not shown), and the shaft of motor 14 extends through motor 14 to both sides, on each of the sides exhaust-air fan 12 and supply-air fan 13 are rigidly mounted respectively. This structure allows coupling the rpm control function widely used to the DC motor with ease and working the function, so that the rpm can be controlled accurately by detecting a value of the electric current input to the motor. As a result, exhaust-air volume can be suppressed with ease. On top of that, the DC motor consumes so little power that energy saving can be expected.

When supply-air 17 passing through supply-air channel 18 is cut off by damper 20, the operation of motor 14 is changed to a small air-volume mode so that the rpm of exhaust-air fan 12 can be suppressed in order to prevent a static pressure in the room from becoming an extreme negative pressure. However, the exhaust-air is exhausted more than a set volume in the following cases: exhaust-air duct 2 and supply-air duct 3 are so short and thus so small resistance is expected in the ventilator that exhaust-air 15 can be exhausted with ease, or the room per se is small.

To overcome the foregoing problem, the following mechanism is usable in the ventilator: For instance at a variable stationary cycle of 50 ms cycle issued from the transmitter of rpm sensing means 26, a pulse wave of 200 cycle is transmitted. When receiver 31 reads a signal which can arbitrarily changes the stationary cycle, and calculates an actual rpm of exhaust-air fan 12, then sends the resultant signal to rpm control means 27. A frequency to be input to motor 13, which drives exhaust-air fan 12, can be changed in response to the comparison between the resultant signal and the set value. This mechanism allows suppressing an increase of the rpm depending on the duct situation or the space of the room, so that an increase of the exhaust-air volume is suppressed. The mechanism also allows preventing an increase of draft coming into the room through crevices due to excessive sucking, or preventing an inconvenience such as the door is hard to open due to an extreme negative pressure in the room.

Static pressure sensing means 29 is provided in exhaust-air channel 16 for reading a difference in pressure between exhaust-air channel 16 and supply-air channel 18. When the pressure difference between these channels exceeds a set value, static pressure sensing means 29 issues a signal to rpm control means 27A which is placed for controlling the rpm of exhaust-air fan 12. For instance, when cut-off damper 20 is closed, air-inlet 11 of supply-air channel 18 has 0 (zero) mm water head, and air-outlet 10 of exhaust-air channel 16 has +7 mm water head, so that there is a pressure difference of 7 mm water head, which is set as the set value discussed above. Installation of the heat exchange type ventilator of the present invention in the condition of long ducts and a spacious room will change the pressure difference between channels 16 and 18 to, e.g. 8-9 mm water head depending on the installing condition. However, static pressure sensing means 29 senses the pressure difference and sends a signal to rpm control means 27A, which can change the rpm to agree with the set pressure difference, for changing the rpm. As a result, an excessive exhausting of air is suppressed, so that the room is prevented from becoming an excessive negative pressure state. Noises due to increasing of the rpm can be suppressed, and on the contrary, the rpm can be raised to increase the air volume when a necessary air volume is not obtained.

Embodiment 2

Figure 5:
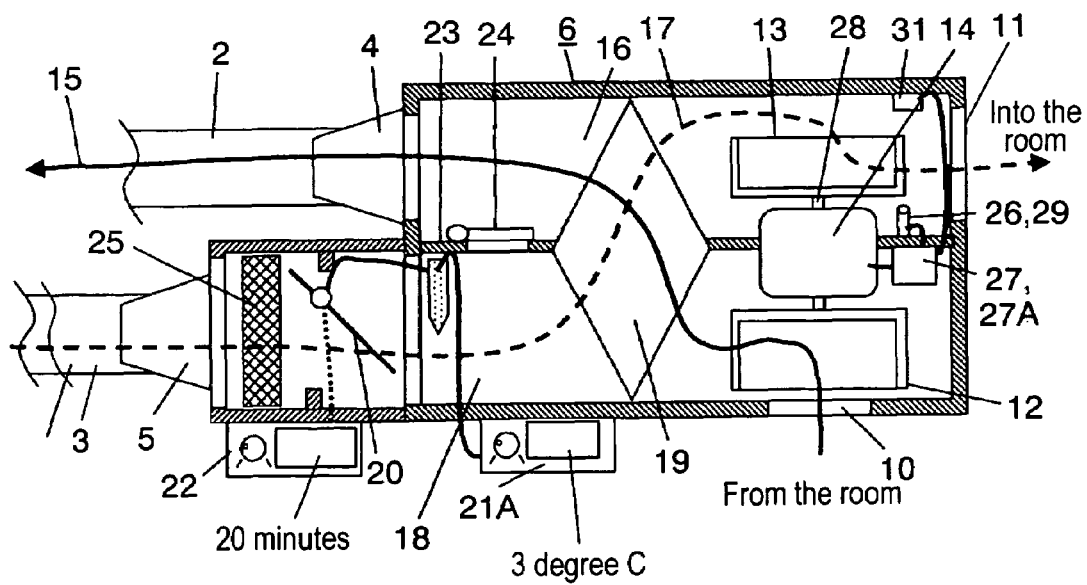
FIG. 5 shows a front view illustrating a structure of a heat exchange type ventilator in accordance with an embodiment of the present invention.

The heat exchange type ventilator in accordance with the second embodiment includes, as shown in FIG. 5, supply-air temperature sensing means 21A with which a resident or an installing engineer can arbitrarily set a temperature to be sensed by sensing means 21A.

In a bathroom or a washroom where the resident feels the supply-air rather cool, or other places where a difference in temperature between the inside and the outside is extremely large particularly in winter season, the temperature to be sensed is changed from, e.g. −10 C degree to 0 (zero) degree C., so that supply-air temperature sensing means 21A can issue a signal to cut-off damper 20 in an earlier stage. A thermistor is regularly used as supply-air temperature sensing means 21A, and a resistance value changing in response to the atmosphere around the thermistor is read as a signal, and the signal is sent to damper 20 with a temperature, which the resident can arbitrarily set, as a threshold value. This mechanism allows damper 20 to be closed earlier than regular operation, so that supply-air 17 can be cut off in response to an environment or a period in which cool feeling is preferably suppressed. As a result, objectionable feeling to the resident can be substantially reduced. Elements similar to those described in the first embodiment have the same reference marks here, and the descriptions thereof are omitted.

Embodiment 3

Figure 6:
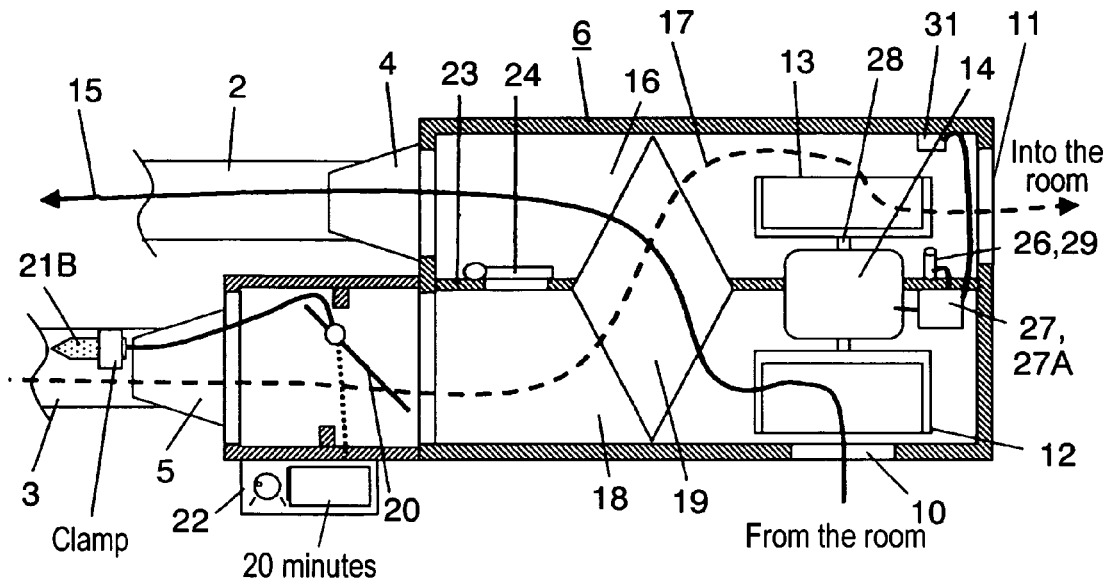
FIG. 6 shows a front view illustrating a structure of a heat exchange type ventilator in accordance with an embodiment of the present invention.

The heat exchange type ventilator in accordance with the third embodiment includes, as shown in FIG. 6, supply-air temperature sensing means 21B detachable from the device, and sensing means 21B can be placed and rigidly mounted with a clamp to anyplace in supply-air channel 18.

In the vicinity of ventilating unit 6, an air-conditioner is placed in the room. When the air-conditioner influences the atmosphere around supply-air temperature means 21B, or when it leaks air due to imperfect piping work, the temperature of supply-air 17 sometimes becomes unstable. In such a case, it is often happened that the set temperature cannot be sensed. This embodiment, however, allows re-fixing the clamp already mounted with screws at a place, where a stable outside temperature can be sensed, and clamping supply-air temperature sensing means 21B with the clamp. This structure allows damper 20 to work accurately free from influence caused by the fixed place. Elements similar to those described in the first embodiment have the same reference marks here, and the descriptions thereof are omitted.

Embodiment 4

Figure 7:
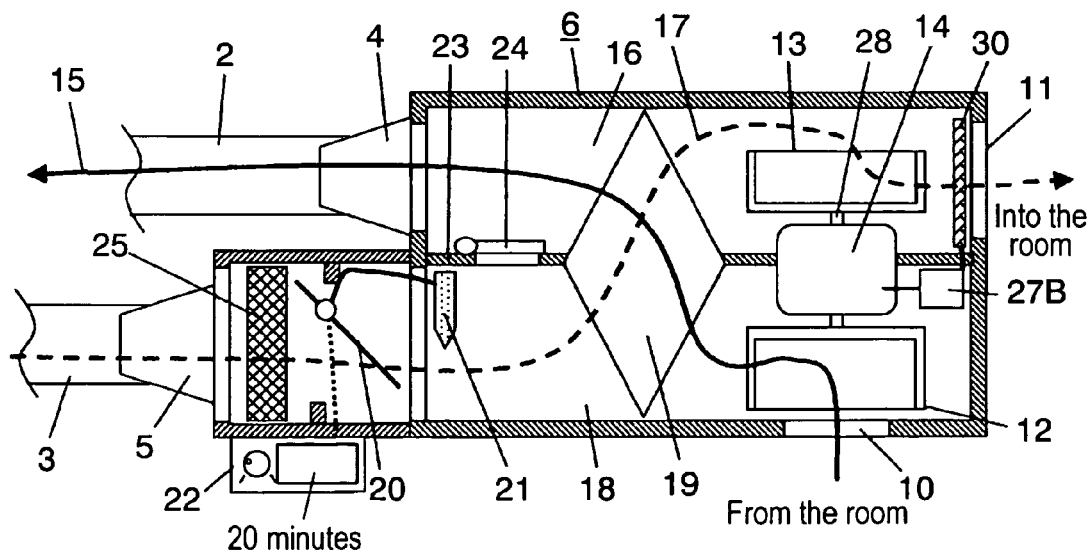
FIG. 7 shows a front view illustrating a structure of a heat exchange type ventilator in accordance with an embodiment of the present invention.
Figure 8:
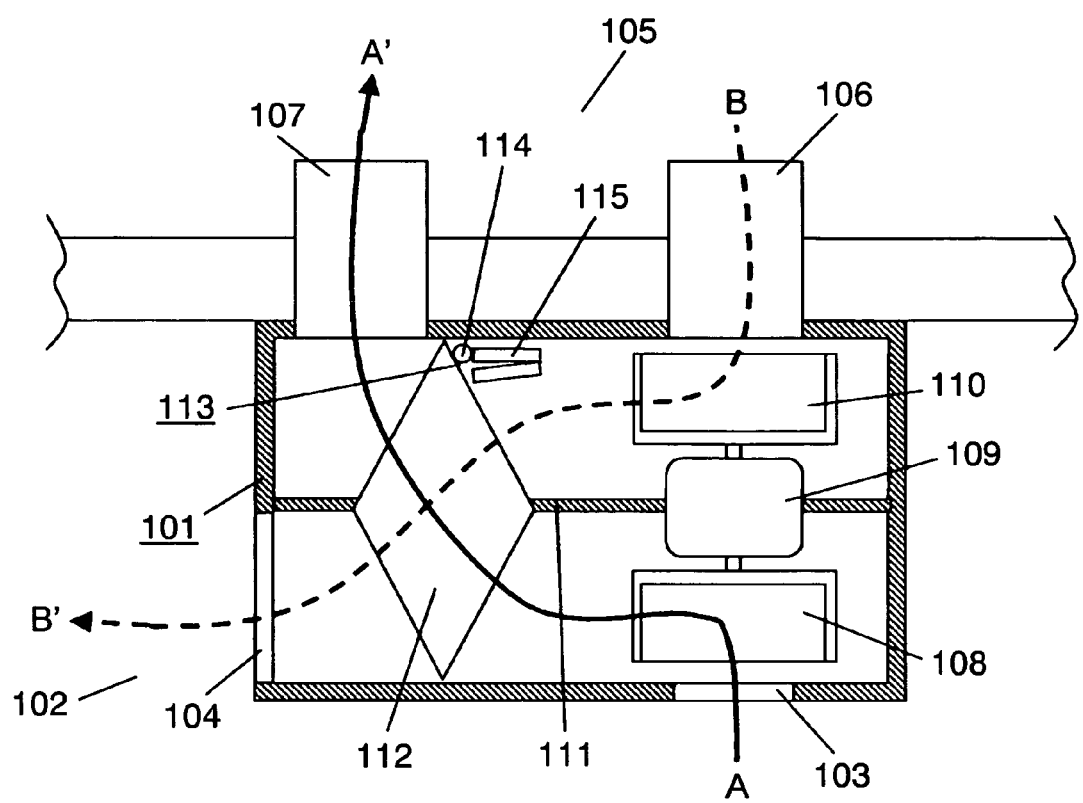
FIG. 8 shows a front view of a conventional heat exchange type ventilator.

The heat exchange type ventilator in accordance with the fourth embodiment includes, as shown in FIG. 7, air volume sensing means 30 at ventilating unit 6 for sensing an exhaust-air volume. Air volume sensing means 30 issues a signal to rpm control means 27B for controlling the rpm of exhaust-air fan 12. Sensing means 30 is usually formed of a netlike air speed sensor because of small resistance, and it firstly senses an air speed, then multiplies the air speed by an effective sensible area to find an air volume.

While supply-air 17 is stopped by cut-off damper 20, exhaust-air is exhausted more than the resident expects, so that problems happen such that draft occurs and the door becomes hard to open. In such a case, air volume sensing means 30 is placed near exhaust-air outlet 10 so that rpm control means 27B changes the rpm not to exhaust air more than necessary, and the air volume thus becomes stable at a required volume. Elements similar to those described in the first embodiment have the same reference marks here, and the descriptions thereof are omitted.

As discussed in the previous embodiments, the heat exchange type ventilator of the present invention senses a temperature of supply-air with the supply-air temperature means, thereby cutting off the supply-air flow by working the cut-off damper. Cool air is thus not delivered to the heat exchanger, so that buildup of ice in the exhaust air channel of the heat exchanger can be prevented. Since the supply-air at a low temperature is stopped, the resident does not feel rather cool.

The heat exchange type ventilator of the present invention allows the resident to change arbitrarily an operation temperature of the cut-off damper with ease considering the installed place and the status of usage of the device. The cut-off damper can cut off the supply-air flow in response to the temperature of the supply-air entering into the device at a low temperature.

The heat exchange type ventilator of the present invention allows changing intervals of passing through the heat exchanger of the supply-air whose flow is cut off by the damper, thereby preventing the buildup of ice in the heat exchanger. It also allows retaining intervals between opening and closing actions of the cut-off damper, so that frequent opening and closing actions of the damper in a short time (so called "chattering") can be prevented. As a result, noises can be suppressed and the durability of the device can be improved.

The heat exchange type ventilator of the present invention allows delivering stale interior air, which is to be exhausted to the outdoors by the exhaust-air fan, to the supply-air channel via the on/off valve. This passing through the supply-air channel of the exhaust-air delivers exhaust heat to the supply-air side of the heat exchanger, so that the temperature of the heat exchanger becomes close to the room temperature for preventing the buildup of ice in the heat exchanger before it happens.

The heat exchange type ventilator of the present invention allows heating the supply-air passing through the heat exchanger up to the temperature before freezing the air, thereby preventing the buildup of ice in the heat exchanger beforehand.

The heat exchange type ventilator of the present invention considers the situation which tends to affect a temperature sensing or a request for measuring strictly a supply-air temperature in the exhaust-air duct at a place nearer to the outdoors, and thus allows creating a temperature sensing environment independent of the installation condition of the device. This structure improves the accuracy of sensing temperatures at sensing stages before the supply-air temperature means.

The heat exchange type ventilator of the present invention allows sensing an amount of current input to the DC motor, thereby retaining the rpm at a given level even when the exhaust-air volume increases abruptly caused by cutting off of the supply-air flow with the damper. The rpm can be thus reduced with ease, which suppresses the exhaust-air volume to increase more than necessary.

The heat exchange type ventilator of the present invention considers balance between exhaust-air and supply-air in the environment where the supply-air is cut off with the damper, and allows lowering the rpm of the exhaust-air fan for reducing an exhaust-air volume, so that the increase of objectionable draft in the room can be prevented.

The heat exchange type ventilator of the present invention allows reading a pressure difference between exhaust-air and supply-air in the ventilating unit in the environment where the supply-air is cut off with the damper, controlling the static pressures both in the exhaust-air channel and the supply-air channel not to rise more than necessary, and lowering the rpm of the exhaust-air fan, thereby reducing the exhaust-air volume. As a result, the increase of objectionable draft in the room can be prevented.

The heat exchange type ventilator of the present invention allows lowering the rpm of the exhaust-air fan for reducing the exhaust-air volume in the environment where the supply-air is cut off with the damper so that the increase of objectionable draft in the room can be prevented.

INDUSTRIAL APPLICABILITY

The heat exchange type ventilator of the present invention is useful for the application that needs preventing buildup of ice in the heat exchanger, and suppressing cool feeling to the resident when fresh outside air at an extreme low temperature is drawn into the room.

The invention claimed is:

1. A heat exchange type ventilator comprising:
   an exhaust-air coupling section communicating with outdoors via a duct for forming an exhaust-air channel and coupled to a lateral side of the ventilator;
   a supply-air coupling section communicating with outdoors via a duct for forming a supply-air channel and coupled to a lateral side of the ventilator; and
   a ventilating unit having a box-like shape and including an exhaust-air outlet for sucking stale interior air through an opening disposed on an underside of the ventilating unit and a supply-air inlet for drawing fresh outside air into a room, the ventilating unit comprising:

a motor for driving an exhaust-air fan and a supply-air fan;

a heat exchanger for recovering exhausted heat between the interior air sucked through the exhaust-air outlet and the fresh outdoor air drawn in;

a cut-off damper for cutting off a flow of the supply-air in the supply-air channel running from the supply-air coupling section to the supply-air inlet; and supply-air temperature sensing means for sensing a temperature of the outside air drawn in, wherein the cut-off damper cuts off the flow of the supply-air based on a signal issued from the supply-air temperature sensing means, and the motor reduces a speed of the exhaust-air fan based on the signal issued from the supply-air temperature sensing means to reduce a volume of the exhaust air exhausted by the exhaust-air fan.

2. The heat exchange type ventilator of claim 1, wherein a temperature to be sensed by the supply-air temperature sensing means is settable or changeable.

3. The heat exchange type ventilator of claim 1 further comprising a timer which can arbitrarily set a closing time of the cut-off damper.

4. The heat exchange type ventilator of claim 1, wherein the ventilating unit further includes an on/off valve which allows a part of the exhaust-air channel running from the exhaust-air coupling section to the exhaust-air outlet to communicate with the supply-air channel in part.

5. The heat exchange type ventilator of claim 1 further comprising a heater for preheating the supply-air drawn in through the supply-air coupling section just before the supply-air passes through the heat exchanger.

6. The heat exchange type ventilator of claim 1, wherein the supply-air temperature sensing means is detachable, and mountable anyplace in the supply-air channel.

7. The heat exchange type ventilator of claim 1, wherein the exhaust-air fan and the supply-air fan are driven by a DC motor.

8. The heat exchange type ventilator of claim 1 further comprising:

rpm sensing means for sensing an rpm of the exhaust-air fan; and rpm control means for controlling an rpm of the exhaust-air fan based on a signal issued from the rpm sensing means.

9. The heat exchange type ventilator of claim 1 further comprising:

a pressure sensor for sensing a static pressure in the exhaust-air channel; and rpm control means for controlling an rpm of the exhaust-air fan based on a signal issued from the static pressure sensing means.

10. The heat exchange type ventilator of claim 1 further comprising:

air volume sensing means for sensing a volume of the exhaust-air; and rpm control means for controlling an rpm of the exhaust-air fan with a signal issued from the air volume sensing means.

* * * * *